US009865159B2

(12) United States Patent
Baldwin et al.

(10) Patent No.: US 9,865,159 B2
(45) **Date of Patent: *Jan. 9, 2018**

(54) DISRUPTING BONE CONDUCTION SIGNALS

(71) Applicant: AT&T Intellectual Property I, L.P., Atlanta, GA (US)

(72) Inventors: Christopher Baldwin, Algonquin, IL (US); Brian S. Amento, Morris Plains, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/161,499

(22) Filed: May 23, 2016

(65) Prior Publication Data

US 2016/0267778 A1 Sep. 15, 2016

Related U.S. Application Data

(63) Continuation of application No. 14/083,110, filed on Nov. 18, 2013, now Pat. No. 9,349,280.

(51) Int. Cl.

*G08C 19/12* (2006.01)
*G08C 17/00* (2006.01)
*G08C 17/02* (2006.01)

(52) U.S. Cl.

CPC ............. *G08C 17/00* (2013.01); *G08C 17/02* (2013.01)

(58) Field of Classification Search

CPC ...................................................... G08C 17/00
USPC ...................................................... 340/13.24
See application file for complete search history.

(56) References Cited

U.S. PATENT DOCUMENTS 3,629,521 A 12/1971 Puharich et al.
4,048,986 A 9/1977 Ott
4,340,778 A 7/1982 Cowans et al.
4,421,119 A 12/1983 Pratt
4,720,607 A 1/1988 de Moncuit
4,754,763 A 7/1988 Doemland
4,799,498 A 1/1989 Collier
5,024,239 A 6/1991 Rosenstein
5,073,950 A 12/1991 Colbert et al.
5,319,747 A 6/1994 Gerrissen et al.
5,327,506 A 7/1994 Stites, III
5,368,044 A 11/1994 Cain et al.

(Continued)

FOREIGN PATENT DOCUMENTS

AU 2003257031 2/2004
AU 2007200415 8/2007

(Continued)

OTHER PUBLICATIONS

U.S. Appl. No. 14/482,087, filed Sep. 10, 2014.

(Continued)

*Primary Examiner* — Kerri McNally
(74) *Attorney, Agent, or Firm* — Hartman & Citrin LLC

(57) ABSTRACT

Concepts and technologies are disclosed herein for disrupting bone conduction signals. According to one aspect, a device can receive a signal via a communication path that is external to a body of a user associated with the device. The device can generate a disruption signal to disrupt the signal. The device can send the disruption signal through the body of the user to disrupt the signal.

17 Claims, 11 Drawing Sheets

100
SIGNAL DETECTION SYSTEM 114
RELAYED SIGNAL 116
USER DEVICE 110
DISRUPTION SIGNAL 112
SIGNAL SOURCE 108
SIGNAL 106
104
112
106
SURFACE
102

(56) References Cited

U.S. PATENT DOCUMENTS 5,495,241 A 2/1996 Doing et al.
5,615,681 A 4/1997 Ohtomo
5,664,227 A 9/1997 Mauldin et al.
5,720,290 A 2/1998 Buhler
5,749,363 A 5/1998 Ishii
5,766,208 A 6/1998 Mcewan
5,810,731 A 9/1998 Sarvazyan et al.
5,836,876 A 11/1998 Dimarogonas
6,024,711 A 2/2000 Lentle
6,115,482 A 9/2000 Sears et al.
6,135,951 A 10/2000 Richardson et al.
6,151,208 A 11/2000 Bartlett
6,213,934 B1 4/2001 Bianco
6,234,975 B1 5/2001 McLeod et al.
6,336,045 B1 1/2002 Brooks
6,380,923 B1 4/2002 Fukumoto
6,396,930 B1 5/2002 Vaudrey et al.
6,409,684 B1 6/2002 Wilk
6,507,662 B1 1/2003 Brooks
6,580,356 B1 6/2003 Alt et al.
6,589,287 B2 7/2003 Lundborg
6,631,197 B1 10/2003 Taenzer
6,754,472 B1 6/2004 Williams et al.
6,783,501 B2 8/2004 Takahashi et al.
6,844,660 B2 1/2005 Scott
6,898,299 B1 5/2005 Brooks
7,010,139 B1 3/2006 Smeehuyzen
7,123,752 B2 10/2006 Kato et al.
7,148,879 B2 12/2006 Amento et al.
7,198,607 B2 4/2007 Jamsen
7,206,423 B1 4/2007 Feng et al.
7,232,416 B2 6/2007 Czernicki
7,289,853 B1 * 10/2007 Campbell ............. A61N 1/375
607/32
7,370,208 B2 5/2008 Levin et al.
7,405,725 B2 7/2008 Mohri et al.
7,536,557 B2 5/2009 Murakami et al.
7,539,533 B2 5/2009 Tran
7,615,018 B2 11/2009 Nelson et al.
7,625,315 B2 12/2009 Hickman
7,648,471 B2 1/2010 Hobson
7,671,351 B2 3/2010 Setlak et al.
7,708,697 B2 5/2010 Wilkinson et al.
7,760,918 B2 7/2010 Bezvershenko et al.
7,778,848 B1 8/2010 Reeves
7,796,771 B2 9/2010 Calhoun et al.
7,878,075 B2 2/2011 Johansson et al.
7,914,468 B2 3/2011 Shalon et al.
7,918,798 B2 4/2011 Wu
8,023,669 B2 9/2011 Segev et al.
8,023,676 B2 9/2011 Abolfathi et al.
8,031,046 B2 10/2011 Franza et al.
8,098,129 B2 1/2012 Falck et al.
8,196,470 B2 6/2012 Gross et al.
8,200,289 B2 6/2012 Joo et al.
8,253,693 B2 8/2012 Buil et al.
8,270,637 B2 9/2012 Abolfathi
8,270,638 B2 9/2012 Abolfathi et al.
8,312,660 B1 11/2012 Fujisaki
8,348,936 B2 1/2013 Trembly et al.
8,421,634 B2 4/2013 Tan et al.
8,467,742 B2 6/2013 Hachisuka et al.
8,482,488 B2 7/2013 Jannard
8,491,446 B2 7/2013 Hinds et al.
8,500,271 B2 8/2013 Howell et al.
8,521,239 B2 8/2013 Hosoi et al.
8,540,631 B2 9/2013 Penner et al.
8,542,095 B2 9/2013 Kamei
8,560,034 B1 10/2013 Diab et al.
8,594,568 B2 11/2013 Falck
8,750,852 B2 6/2014 Forutanpour et al.
8,922,427 B2 12/2014 Dehnie et al.
9,031,293 B2 5/2015 Kalinli-Akbacak
9,349,280 B2 * 5/2016 Baldwin ............... G08C 17/02
9,386,962 B2 7/2016 Dahl
2001/0013546 A1 8/2001 Ross
2001/0051776 A1 12/2001 Lenhardt
2003/0048915 A1 3/2003 Bank
2003/0066882 A1 4/2003 Ross
2003/0125017 A1 7/2003 Greene et al.
2003/0133008 A1 7/2003 Stephenson
2004/0152440 A1 8/2004 Yoda et al.
2005/0210269 A1 9/2005 Tiberg
2006/0018488 A1 1/2006 Viala et al.
2006/0132455 A1 6/2006 Rimas-Ribikauskus
2006/0149337 A1 7/2006 John
2007/0012507 A1 1/2007 Lyon
2007/0142874 A1 6/2007 John
2008/0064955 A1 3/2008 Miyajima
2008/0084859 A1 4/2008 Sullivan
2008/0223925 A1 9/2008 Saito et al.
2008/0260211 A1 10/2008 Bennett et al.
2009/0149722 A1 6/2009 Abolfathi et al.
2009/0228791 A1 9/2009 Kim
2009/0234262 A1 9/2009 Reid, Jr. et al.
2009/0287485 A1 11/2009 Glebe
2009/0289958 A1 11/2009 Kim et al.
2009/0304210 A1 * 12/2009 Weisman ............. H04R 1/1083
381/151
2009/0309751 A1 12/2009 Kano et al.
2010/0016741 A1 1/2010 Mix et al.
2010/0066664 A1 3/2010 Son et al.
2010/0137107 A1 6/2010 Jamsa et al.
2010/0162177 A1 6/2010 Eves et al.
2010/0168572 A1 7/2010 Sliwa et al.
2010/0286571 A1 11/2010 Allum et al.
2010/0297944 A1 11/2010 Lee
2010/0315206 A1 12/2010 Schenk et al.
2010/0316235 A1 12/2010 Park et al.
2010/0328033 A1 12/2010 Kamei
2011/0022025 A1 1/2011 Savoie et al.
2011/0125063 A1 5/2011 Shalon et al.
2011/0134030 A1 6/2011 Cho
2011/0135106 A1 6/2011 Yehuday et al.
2011/0137649 A1 6/2011 Rasmussen et al.
2011/0152637 A1 6/2011 Kateraas et al.
2011/0155479 A1 6/2011 Oda
2011/0227856 A1 9/2011 Corroy et al.
2011/0245669 A1 10/2011 Zhang
2011/0255702 A1 10/2011 Jensen
2011/0260830 A1 10/2011 Weising
2011/0269601 A1 11/2011 Nelson et al.
2011/0276312 A1 11/2011 Shalon et al.
2011/0280239 A1 11/2011 Tung et al.
2011/0282662 A1 11/2011 Aonuma et al.
2012/0010478 A1 1/2012 Kinnunen et al.
2012/0011990 A1 1/2012 Mann
2012/0058859 A1 3/2012 Elsom-Cook et al.
2012/0065477 A1 3/2012 Enomoto
2012/0065506 A1 3/2012 Smith
2012/0143693 A1 6/2012 Chung et al.
2012/0202479 A1 8/2012 Sugitani et al.
2012/0212441 A1 8/2012 Christiansson et al.
2012/0280900 A1 11/2012 Wang et al.
2012/0290832 A1 11/2012 Antequera Rodriguez et al.
2013/0034238 A1 2/2013 Abolfathi
2013/0041235 A1 2/2013 Rogers et al.
2013/0097292 A1 4/2013 Yoakum et al.
2013/0119133 A1 5/2013 Michael et al.
2013/0120458 A1 5/2013 Celebisoy et al.
2013/0135223 A1 5/2013 Shai
2013/0142363 A1 6/2013 Amento et al.
2013/0170471 A1 7/2013 Nix
2013/0171599 A1 7/2013 Bleich et al.
2013/0173926 A1 7/2013 Morese et al.
2013/0212648 A1 8/2013 Tietjen et al.
2013/0215060 A1 8/2013 Nakamura
2013/0225915 A1 8/2013 Redfield et al.
2013/0225940 A1 8/2013 Fujita et al.
2013/0257804 A1 10/2013 Vu et al.
2013/0278396 A1 10/2013 Kimmel
2013/0288655 A1 10/2013 Foruntanpour et al.
2013/0346620 A1 12/2013 Gizis et al.
2014/0009262 A1 1/2014 Robertson et al.

(56) References Cited

U.S. PATENT DOCUMENTS

| | | | |
|---|---|---|---|
| 2014/0028604 | A1 | 1/2014 | Morinaga et al. |
| 2014/0035884 | A1 | 2/2014 | Oh et al. |
| 2014/0097608 | A1 | 4/2014 | Buzhardt et al. |
| 2014/0099991 | A1 | 4/2014 | Cheng et al. |
| 2014/0107531 | A1 | 4/2014 | Baldwin |
| 2014/0156854 | A1 | 6/2014 | Gaetano, Jr. |
| 2014/0168093 | A1 | 6/2014 | Lawrence |
| 2014/0168135 | A1 | 6/2014 | Saukko et al. |
| 2014/0174174 | A1 | 6/2014 | Uehara et al. |
| 2014/0188561 | A1 | 7/2014 | Tenbrock et al. |
| 2014/0210791 | A1 | 7/2014 | Hanauer et al. |
| 2014/0240124 | A1 | 8/2014 | Bychkov |
| 2015/0084011 | A1 | 3/2015 | Park et al. |
| 2015/0092962 | A1 | 4/2015 | Amento et al. |
| 2015/0120465 | A1 | 4/2015 | Baldwin et al. |
| 2015/0128094 | A1 | 5/2015 | Baldwin et al. |
| 2015/0137936 | A1 | 5/2015 | Baldwin et al. |
| 2015/0137960 | A1 | 5/2015 | Baldwin et al. |
| 2015/0138062 | A1 | 5/2015 | Baldwin et al. |
| 2015/0150116 | A1 | 5/2015 | Baldwin et al. |
| 2015/0199950 | A1 | 7/2015 | Heiman |

FOREIGN PATENT DOCUMENTS

| | | |
|---|---|---|
| CA | 1207883 | 7/1986 |
| EP | 0712114 | 5/1996 |
| EP | 0921753 | 6/1999 |
| EP | 1436804 | 2/2004 |
| EP | 2312997 | 4/2011 |
| EP | 2643981 | 5/2012 |
| EP | 2483677 | 8/2012 |
| GB | 2226931 | 7/1990 |
| GB | 2348086 | 9/2000 |
| JP | 02249017 | 10/1990 |
| JP | 04-317638 A | 11/1992 |
| JP | 2003058190 | 2/2003 |
| JP | 2005142729 | 6/2005 |
| JP | 2010210730 | 9/2010 |
| KR | 20100056688 | 10/1990 |
| TW | 200946887 | 8/1997 |
| WO | WO 8201329 | 4/1982 |
| WO | WO 9601585 | 1/1996 |
| WO | WO 03033882 | 4/2003 |
| WO | WO 2006094372 | 6/2006 |
| WO | WO 2009001881 | 12/2008 |
| WO | WO 2010045158 | 4/2010 |
| WO | WO 2012168534 | 12/2012 |

OTHER PUBLICATIONS

U.S. Appl. No. 14/482,091, filed Sep. 10, 2014.
U.S. Appl. No. 14/482,101, filed Sep. 10, 2014.
U.S. Appl. No. 14/482,078, filed Sep. 10, 2014.
U.S. Appl. No. 14/514,658, filed Oct. 15, 2014.
U.S. Office Action dated Mar. 8, 2010 in U.S. Appl. No. 11/586,142.
U.S. Office Action dated Aug. 12, 2010 in U.S. Appl. No. 11/586,142.
Examiner's Answer to Appeal Brief dated Apr. 22, 2011 in U.S. Appl. No. 11/586,142.
Patent Board Decision on Appeal dated Sep. 25, 2014 in U.S. Appl. No. 11/586,142.
Notice of Allowance dated Dec. 18, 2014 in U.S. Appl. No. 11/586,142.
U.S. Office Action dated Aug. 25, 2015 in U.S. Appl. No. 11/586,142.
U.S. Office Action dated Feb. 13, 2013 in U.S. Appl. No. 13/309,124.
U.S. Office Action dated Sep. 24, 2013 in U.S. Appl. No. 13/309,124.
U.S. Office Action dated Jan. 29, 2014 in U.S. Appl. No. 13/309,124.
U.S. Office Action dated Aug. 25, 2015 in U.S. Appl. No. 14/083,094.
U.S. Office Action dated Jun. 25, 2015 in U.S. Appl. No. 14/083,110.
U.S. Notice of Allowance dated Oct. 22, 2015 in U.S. Appl. No. 14/083,110.
U.S. Office Action mailed Dec. 17, 2015 in U.S. Appl. No. 14/063,663.
U.S. Office Action mailed Feb. 25, 2016 in U.S. Appl. No. 14/072,126.
U.S. Office Action mailed Nov. 19, 2015 in U.S. Appl. No. 14/083,499.
U.S. Notice of Allowance mailed Apr. 4, 2016 in U.S. Appl. No. 14/083,499.
U.S. Office Action mailed Nov. 19, 2015 in U.S. Appl. No. 14/090,668.
U.S. Notice of Allowance mailed Mar. 21, 206 in U.S. Appl. No. 14/090,668.
U.S. Office Action mailed Mar. 16, 2016 in U.S. Appl. No. 14/482,087.
U.S. Office Action mailed Mar. 10, 2016 in U.S. Appl. No. 14/482,091.
U.S. Office Action mailed Jan. 11, 2016 in U.S. Appl. No. 14/514,658.
Zhong et al., "OsteoConduct: Wireless Body-Area Communication based on Bone Conduction," Proceeding of the ICST 2nd International Conference on Body Area Networks, BodyNets 2007.
Travis Deyle et al., "Hambone: A bio-acoustic gesture interface," 2007 11th IEEE International Symposium on Wearable Computers, 2007.
Scanlon, Michael V. Acoustic sensor for health status monitoring. Army Research Lab Aberdeen Proving Ground MD, 1998.
Lopez, et al., "New healthcare society supported by wearable sensors and information mapping-based services." International Journal of Networking and Virtual Organisations 9.3 (2011): 233-247.
Scanlon, Michael V. "Acoustic sensors in the helmet detect voice and physiology." AeroSense 2003. International Society for Optics and Photonics, 2003.
Kompis, Martin, and Rudolf Haeusler, "Electromagnetic interference of bone-anchored hearing aids by cellular phones revisited," Acta oto-laryngologica 122.5, 2002, 510-512.
Amento et al., "The Sound of One Hand: A Wrist-Mounted Bio-Acoustic Fingertip Gesture Interface," Short Talk: It's All About Sound, Apr. 20, 2002, 724-725, ACM, Minneapolis, Minnesota, USA.
"Kinect Gestures," retrieved from http://support.xbox.com/en-US/xbox-360/kinect/body-controller on Oct. 24, 2013.
Mark Billinghurst, "Chapter 14: Gesture Based Interaction," Haptic Input, Aug. 24, 2011.
Chris Harrison, Desney Tan, Dan Morris, "Skinput: Appropriating the Skin as an Interactive Canvas," CommuniCations of the ACM 54.8, 2011, 111-118.
T. Scott Saponas, et al., "Enabling always-available input with muscle-computer interfaces," Proceedings of the 22nd Annual ACM Symposium on User Interface Software and Technology, ACM, 2009.
Jao Henrique Donker, "The Body as a communication medium," 2009.
Sang-Yoon Chang, et al., "Body Area Network Security: Robust Key Establishment Using Human Body Channel," retrieved from https://www.usenix.org/system/files/conference/healthsec12/healthsec12-final15.pdf on Oct. 16, 2013.
Vidya Bharrgavi, et al., "Security Solution for Data Integrity in Wireless BioSensor Networks," Distributed Computing Systems Workshops, 2007, ICDCSW'07, 27th International Conference, IEEE, 2007.
Daniel Halperin, et al., "Pacemakers and Implantable Cardiac Defibrillators: Software Radio Attacks and Zero-Power Defenses," Security and Privacy, SP 2008, IEEE Symposium, IEEE, 2008.
Carmen C. Y. Poon, et al., "A Novel Biometrics Method to Secure Wireless Body Area Sensor Networks for Telemedicine and M-Health," Communications Magazine, IEEE 44.4, 2006, 73-81.

(56) References Cited

OTHER PUBLICATIONS

Zicheng Liu, et al., "Direct Filtering for Air-and Bone-Conductive Microphones," Multimedia Signal Processing, 2004 IEEE 6th Workshop, IEEE, 2004.
Mujibiya, Adiyan, et al. "The sound of touch: on-body touch and gesture sensing based on transdermal ultrasound propagation." Proceedings of the 2013 ACM international conference on Interactive tabletops and surfaces. ACM, 2013.
Harrison, Chris, Robert Xiao, and Scott Hudson. "Acoustic barcodes: passive, durable and inexpensive notched identification tags." Proceedings of the 25th annual ACM symposium on User interface software and technology. ACM, 2012.
Yoo, Jerald, Namjun Cho, and Hoi-Jun Yoo. "Analysis of body sensor network using human body as the channel." Proceedings of the ICST 3rd international conference on Body area networks. ICST (Institute for Computer Sciences, Social-Informatics and Telecommunications Engineering), 2008.
Ni, Tao, and Patrick Baudisch. "Disappearing mobile devices." Proceedings of the 22nd annual ACM symposium on User interface software and technology. ACM, 2009.
"Hinckley, Ken, and Hyunyoung Song, Sensor synaesthesia: touch in motion, and motion in touch." Proceedings of the SIGCHI Conference on Human Factors in Computing Systems. ACM, 2011.
Hinge, Dhanashree, and S. D. Sawarkar. "Mobile to Mobile data transfer through Human Area Network." IJRCCT 2.11 (2013): 1181-1184.
Park, Duck Gun, et al. "TAP: touch-and-play." Proceedings of the SIGCHI conference on Human Factors in computing systems. ACM, 2006.
Ruiz, J. Agud, and Shigeru Shimamoto. "A study on the transmission characteristics of the human body towards broadband intrabody communications." Consumer Electronics, 2005.(ISCE 2005). Proceedings of the Ninth International Symposium on. IEEE, 2005.
Nagai, Ryoji, et al. "Near-Field Coupling Communication Technology for Human-Area Networking." Proc. Conf. on Information and Communication Technologies and Applications (ICTA2011), International Institute of Informatics and Systems (IIIS). 2012.
Lipkova, Jolana, and Jaroslav Cechak. "Transmission of Information Using the Human Body." IMCIC 2010.
Maruf, Md Hasan. "An Input Amplifier for Body-Channel Communication." (2013).
Rekimoto, Jun. "Gesturewrist and gesturepad: Unobtrusive wearable interaction devices." Wearable Computers, 2001. Proceedings. Fifth International Symposium on. IEEE, 2001.
U.S. Office Action dated Jul. 7, 2016 in U.S. Appl. No. 14/072,126.
U.S. Notice of Allowance dated Jul. 12, 2016 in U.S. Appl. No. 14/482,091.
U.S. Office Action dated Sep. 14, 2016 in U.S. Appl. No. 14/482,101.
U.S. Notice of Allowance mailed Oct. 7, 2016 in U.S. Appl. No. 15/224,808.
Office Action mailed Oct. 20, 2016 in U.S. Appl. No. 14/482,078.
U.S. Office Action dated Dec. 14, 2016 in U.S. Appl. No. 14/561,549.
U.S. Office Action dated Apr. 7, 2017 in U.S. Appl. No. 14/065,663.
U.S. Notice of Allowance dated Mar. 28, 2017 in U.S. Appl. No. 15/224,808.
Nakanishi et al. "Biometric Identity Verification Using Intra-Body Propagation Signal." 2007 Biometrics Symposium. IEEE, 2007.
Hachisuka et al. "Development and Performance Analysis of an Intra-Body Communication Device." The 12th International Conference on Solid State Sensors, Actuators and Microsystems, Boston, Jun. 8-12, 2003. IEEE, 2003.
U.S. Office Action dated Jun. 1, 2017 in U.S. Appl. No. 14/482,078.
U.S. Office Action dated Apr. 21, 2017 in U.S. Appl. No. 15/450,624.
U.S. Notice of Allowance dated Aug. 21, 2017 in U.S. Appl. No. 14/065,663.
U.S. Notice of Allowance dated Aug. 22, 2017 in U.S. Appl. No. 15/450,624.
U.S. Notice of Allowance dated Nov. 17, 2017 in U.S. Appl. No. 14/482,101.

* cited by examiner

DISRUPTING BONE CONDUCTION SIGNALS

CROSS-REFERENCE TO RELATED APPLICATIONS

This application is a continuation of U.S. patent application Ser. No. 14/083,110, filed Nov. 18, 2013, now U.S. Pat. No. 9,349,280, which is incorporated herein by reference in its entirety.

BACKGROUND

Bone conduction is a developing communication technology with numerous potential applications. One such application is the ability to send signals carrying advertisements into the bodies of individuals when they come into contact with a surface. This method of advertising may be beneficial because advertisements can be targeted only to individuals that are in contact with the surface, but there are instances in which an individual might not want to receive advertisements. For example, an individual that is trying to sleep with his or her head propped against the window of a passenger train may not want to be bombarded with advertisements.

SUMMARY

Concepts and technologies are disclosed herein for disrupting bone conduction signals. According to one aspect, a device can receive a signal via a communication path that is external to a body of a user associated with the device. The device can generate a disruption signal to disrupt the signal. The device can send the disruption signal through the body of the user to disrupt the signal.

In some embodiments, the device can receive the signal from a signal detection system. In some other embodiments, the device can receive the signal directly from a signal source.

In some embodiments, the device receives the signal from a database. In these embodiments, the device may receive a portion of the signal, and in response, generate a request directed to a database. The request can include the portion of the signal and instructions for the database to return the entirety of the signal. The device can receive the signal from the database and utilize this signal to generate the disruption signal.

In some embodiments, the signal includes or is otherwise associated with an advertisement. The advertisement may be an audible advertisement that is intended to be heard by the user.

In some embodiments, the disruption signal includes the signal after a frequency shift. The frequency shift may render the signal inaudible to the user. In some other embodiments, the disruption signal includes signal characteristics that are used to cancel at least a portion of the signal.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
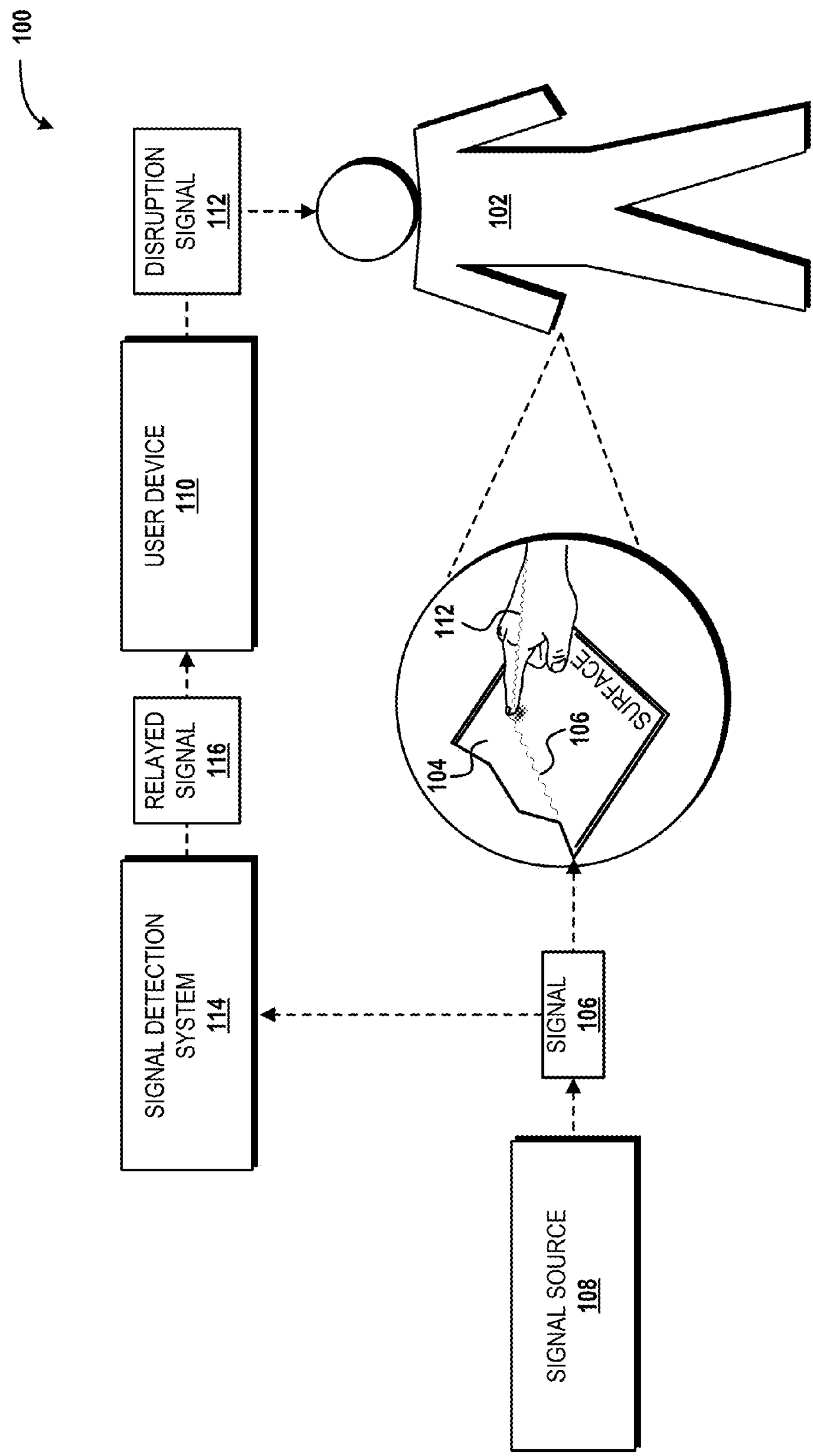
FIG. 1 is a block diagram illustrating aspects of an illustrative operating environment for various concepts disclosed herein, according to an illustrative embodiment.

The following detailed description is directed to disrupting bone conduction signals. According to one aspect, a device can receive a signal via a communication path that is external to a body of a user associated with the device. The device can generate a disruption signal to disrupt the signal. The device can send the disruption signal through the body of the user to disrupt the signal.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including hand-held devices, mobile devices, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, example aspects of disrupting bone conduction signals will be presented.

Referring now to FIG. 1, aspects of an operating environment 100 in which various embodiments presented herein may be implemented will be described, according to an illustrative embodiment. The operating environment 100 shown in FIG. 1 includes a user 102 in contact with a surface 104 that receives a signal 106 from a signal source 108. When the user 102 is in contact with the surface 104, the signal 106 propagates through the surface 104 into the user's 102 body. The signal 106 may be any signal that is capable of propagating through the user 102 via one or more of the user's 102 bones. The propagation of one or more signals through one or more bones of an individual, such as the user 102, is referred to herein as bone conduction. It should be understood that a portion of a given signal may propagate through other parts of the user's 102 body, such as soft tissue and/or skin, in addition to the user's 102 bones.

The signal 106 can carry any information that the signal source 108 is attempting to provide to the user 102. The signal 106 may be within a frequency range that is audible to the user 102 when the user comes into contact with the surface 104. The signal 106 additionally or alternatively can carry any information that the signal source 108 is attempting to provide to a user device 110 that is associated with the user 102. Information that the signal source 108 is attempting to provide to the user device 110 may include content for presentation via the user device 110 in audible and/or visual form. Information that the signal source 108 is attempting to provide to the user device 110 may include content for use by one or more applications executing on the user device 110. Information that the signal source 108 is attempting to provide to the user device 110 may include one or more applications that are to be installed on the user device 110. Information that the signal source 108 is attempting to provide to the user device 110 may include information that is to be stored on the user device 110 whether or not the user device 110 is capable of performing a function using the information. Other types of information can be sent to the user device 110 by the signal source 108 via the signal 106, and as such, the aforementioned example should not be construed as being limiting in any way.

The signal source 108 can include any computing system or device that is capable of generating the signal 106. The signal source 108 may be a smartphone, feature phone, personal digital assistant ("PDA"), tablet device, laptop computer, desktop computer, server computer, video game system, handheld video game system, media player, set-top box, vehicle computing system, smart watch, personal tracker or safety device, other computing system, other computing device, a combination thereof, or the like. It should be understood that the functionality of the signal source 108 can be provided by a single device, by two or more similar devices, and/or by two or more dissimilar devices.

The signal source 108 may be owned and/or operated by an advertiser, an advertising agency, a service provider such as a wireless carrier or television provider, an airline, a railway company, a subway operator, a taxi company, a manufacturer, a retailer, an e-tailer, an individual, a company, or any other entity that desires to provide information to the user 102 and/or the user device 110. If the signal source 108 is owned and/or operated by an advertiser, for example, the signal source 108 may target audible information to the user 102 via the surface 104 so that other individuals (not shown) are not disturbed by the signal 106. In some instances, however, the user 102 may not want to be disturbed by the signal 106 and so can utilize the user device 110 to generate a disruption signal 112 to disrupt the signal 106, as will be described in greater detail below.

In the illustrated operating environment 100, the signal 106 is detected by a signal detection system 114 that relays the signal 106 (shown as "relayed signal 116") to the user device 110. In some embodiments, the signal detection system 114 wirelessly transmits the relayed signal 116 to the user device 110 via BLUETOOTH, ZIGBEE, WI-FI, or other wireless technology. The signal detection system 114, in other embodiments, transmits the relayed signal 116 to the user device 110 via a wired connection provided by Universal Serial Bus ("USB"), Ethernet, or other wired technology.

The signal detection system 114 can include any computing system or device that is capable of detecting the signal 106 and transmitting the relayed signal 116 to the user device 110. The signal detection system 114 may be a smartphone, feature phone, PDA, tablet device, laptop computer, desktop computer, server computer, video game system, handheld video game system, media player, set-top box, vehicle computing system, smart watch, personal tracker or safety device, other computing system, other computing device, a combination thereof, or the like. It should be understood that the functionality of the signal detection system 114 can be provided by a single device, by two or more similar devices, and/or by two or more dissimilar devices. In some embodiments, the signal detection system 114 is worn by the user 102

The signal detection system 114 may be owned and/or operated by or for the user 102. The signal detection system 114 may be owned and/or operated by an advertiser, an advertising agency, a service provider such as a wireless carrier or television provider, an airline, a railway company, a subway operator, a taxi company, a manufacturer, a retailer, an e-tailer, an individual, a company, or any other entity that desires to provide a mechanism by which the signal 106 can be detected and transmitted to the user device 110 so that the user device 110 can generate the disruption signal 112 to disrupt the signal 106.

In some embodiments, the signal detection system 114 is provided as part of a signal disruption service that is implemented in response to the user 102 opting out of receiving information from the signal source 108. In this manner, the signal source 108 can transmit the signal 106 to the surface 104, which may be in contact with multiple users in addition to the user 102, and those individuals that have elected to opt-out will have the signal 106 disrupted via the signal detection system 114 detecting the signal 106, transmitting the relayed signal 116 to the user device 110, which then generates the disruption signal 112 to disrupt the signal 106 that is propagating through the surface 104.

The user device 110 can include any computing system or device that is capable of receiving the relayed signal 116, generating the disruption signal 112, and transmitting the disruption signal 112 to the user's 102 body so that the signal 106 propagating through the surface 104 can be disrupted. The user device 110 may be a smartphone, feature phone, PDA, tablet device, laptop computer, desktop computer, server computer, video game system, handheld video game system, media player, set-top box, vehicle computing system, smart watch, personal tracker or safety device, other computing system, other computing device, a combination thereof, or the like. It should be understood that the functionality of the user device 110 can be provided by a single device, by two or more similar devices, and/or by two or more dissimilar devices. In some embodiments, the user device 110 includes the signal detection system 114. In these embodiments, the signal detection system 114 can be implemented as a software module that is capable of being executed by one or more processors of the user device 110 to perform the operations of the signal detection system 114 described herein.

The user device 110 can receive the relayed signal 116 from the signal detection system 114 and generate the disruption signal 112. The disruption signal 112 may include frequency, amplitude, and/or phase characteristics that at least partially cancel the relayed signal 116. The disruption signal 112 may be generated by changing the frequency, amplitude, and/or phase characteristics of the relayed signal 116. For instances in which the relayed signal 116 is audible to the user 102, the user device 110 may generate the disruption signal 112 by shifting the frequency of the relayed signal 116 to an inaudible range rather than at least partially cancelling out the relayed signal 116.

FIG. 1 illustrates one user 102, one surface 104, one signal 106, one signal source 108, one user device 110, one disruption signal 112, one signal detection system 114, and one relayed signal 116. It should be understood, however, that various implementations of the operating environment 100 include multiple users 102, multiple surfaces 104, multiple signals 106, multiple signal sources 108, multiple user devices 110, multiple disruption signals 112, multiple signal detection systems 114, and/or multiple relayed signals 116. As such, the illustrated embodiment should be understood as being illustrative, and should not be construed as being limiting in any way.

Figure 2:
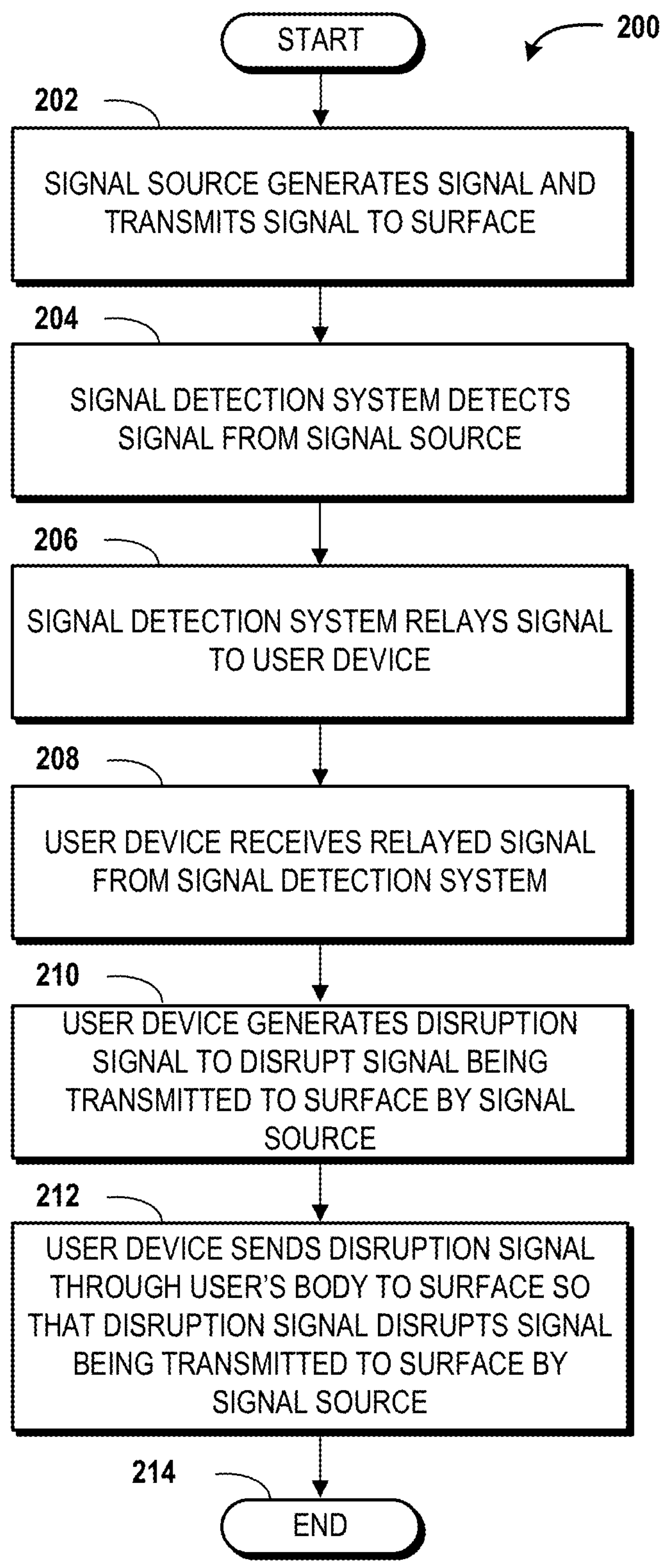
FIG. 2 is a flow diagram illustrating aspects of a method for disrupting a bone conduction signal, according to an illustrative embodiment.

Turning now to FIG. 2, aspects of a method 200 for disrupting a bone conduction signal will be described in detail, according to an illustrative embodiment. It should be understood that the operations of the methods are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in their respective entireties. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including the signal source 108, the user device 110, the signal detection system 114, single-processor or multiprocessor systems, minicomputers, mainframe computers, personal computers, hand-held computing devices, microprocessor-based, programmable consumer electronics, other devices and systems disclosed herein, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof refers to causing a processor of a computing system or device, such as the signal source 108, the user device 110, the signal detection system 114, another device disclosed herein, or another system disclosed herein, to perform one or more operations and/or causing the processor to direct other components of the computing system or device to perform one or more of the operations.

For purposes of illustrating and describing some of the concepts of the present disclosure, the methods disclosed herein are described as being performed, at least in part, by the signal source 108, the signal detection system 114, and the user device 110, where indicated, via execution of one or more software modules and/or software applications. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described with reference to FIG. 2 and further reference to FIG. 1. The method 200 begins at operation 202, where the signal source 108 generates the signal 106 and transmits the signal 106 to the surface 104. From operation 202, the method 200 proceeds to operation 204, where the signal detection system 114 detects the signal 106 being transmitted to the surface 104 by the signal source 108. From operation 204, the method 200 proceeds to operation 206, where the signal detection system 114 relays the signal 106 to the user device 110 as the relayed signal 116.

From operation 206, the method 200 proceeds to operation 208, where the user device 110 receives the relayed signal 116 from the signal detection system 114. The user device 110, at operation 210, generates the disruption signal 112 to disrupt the signal 106 that is being transmitted to the surface 104 by the signal source 108. The user device 110 may generate the disruption signal 112 to include frequency, amplitude, and/or phase characteristics that at least partially cancel the relayed signal 116, which is the same signal as the signal 106 being transmitted by the signal source 108. The disruption signal 112 may be generated by changing the frequency, amplitude, and/or phase characteristics of the relayed signal 116. For instances in which the relayed signal 116 is audible to the user 102, the user device 110 may generate the disruption signal 112 by shifting the frequency of the relayed signal 116 to an inaudible range rather than at least partially cancelling out the relayed signal 116.

From operation 210, the method 200 proceeds to operation 212, where the user device 102 sends the disruption signal 112 through the user's 102 body to the surface 104 so that the disruption signal 112 disrupts the signal 106 being transmitted to the surface 104 by the signal source 108. In this manner, the user 102 and/or the user device 110 is not disturbed by the signal 106.

From operation 212, the method 200 proceeds to operation 214. The method 200 ends at operation 214.

Figure 3:
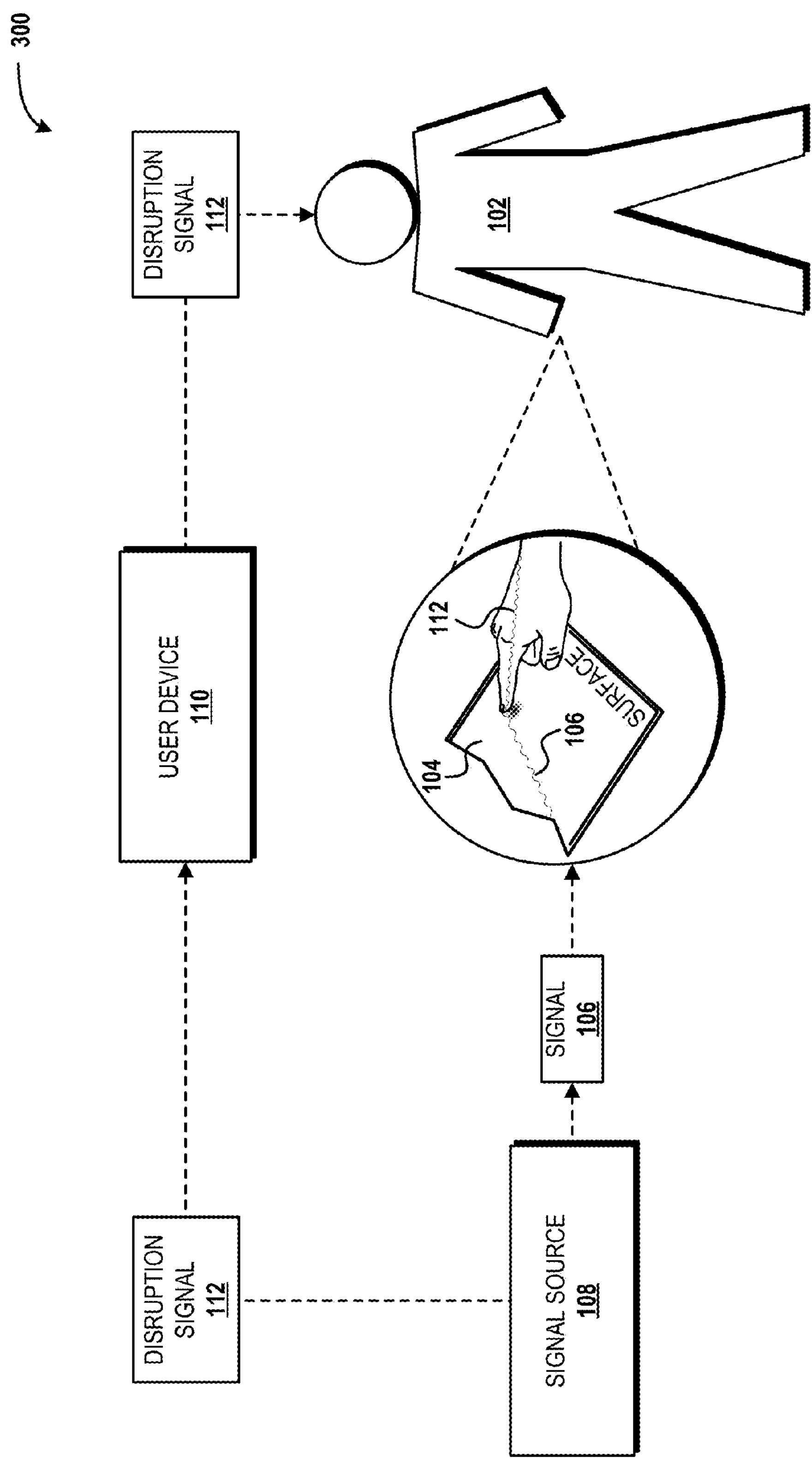
FIG. 3 is a block diagram illustrating aspects of an illustrative operating environment for various concepts disclosed herein, according to another illustrative embodiment.

Turning now to FIG. 3, a block diagram illustrating aspects of another operating environment 300 will be described, according to an illustrative embodiment. The operating environment 300 shown in FIG. 3 includes the user 102 in contact with the surface 104 that receives the signal 106 from the signal source 108. When the user 102 is in contact with the surface 104, the signal 106 propagates through the surface 104 into the user's 102 body. The signal 106 may be any signal as described herein above.

The signal source 108 in FIG. 3 in addition to generating the signal 106 generates the disruption signal 112. The signal source 108 transmits the disruption signal 112 to the user device 110. The signal source 108 may transmit the disruption signal 112 to the user device 110 simultaneously as the signal source 108 transmits the signal 106 to the surface 104. Alternatively, the signal source 108 may transmit the disruption signal 112 to the user device 110 before or after the signal source 108 transmits the signal 106 to the surface 104. The time at which the signal source transmits the disruption signal 112 may be configured by the owner and/or operator of the signal source 108 or selected by the user 102.

The user device 110 receives the disruption signal from the signal source 108 and transmits the disruption signal 112 to the user's 102 body. The disruption signal 112 propagates through the user's 102 body to the surface 104 with which the user 102 is in contact. The disruption signal 112 disrupts the signal 106 that is propagating through the surface 104.

In some embodiments, the user 102 can provide input to the user device 110 to instruct the user device 110 whether or not to disrupt a given signal. In some embodiments, the user 102 provides such input as one or more settings so that the disruption of one or more signals is carried out automatically for the user 102 without further user input. In some other embodiments, the user device 110 notifies the user 102 of the receipt of the disruption signal 112 and prompts the user 102 to instruct the user device 110 on how to proceed—that is, whether or not to use the disruption signal 112 to cancel or otherwise disrupt the signal 106 being transmitted by the signal source 108. The user 102 may instruct the user device 110 to utilize the disruption signal 112 to disrupt the signal 106 before, during, or after the user 102 is disturbed by the signal 106. For the latter scenario, the user device 110 may store the user's 102 preference for disrupting the signal 106 from the signal source 108 such that the signal 106 and/or other signals transmitted by the signal source 108 are disrupted in the future. The user device 110 may build the user's 102 preferences with respect to multiple signals and/or signal sources over time so that the user 102 no longer needs to provide any input or needs to provide less input to the user device 110 with regard to signal disruption.

Figure 4:
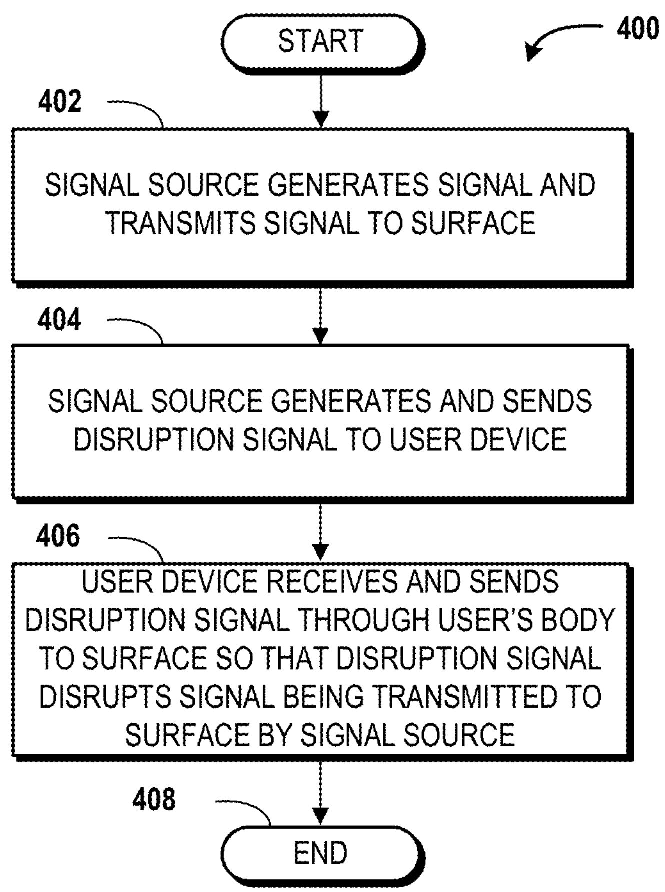
FIG. 4 is a flow diagram illustrating aspects of a method for disrupting a bone condition signal, according to another illustrative embodiment.

Turning now to FIG. 4, aspects of a method 400 for disrupting a bone conduction signal will be described in detail, according to an illustrative embodiment. The method 400 will be described with reference to FIG. 4 and further reference to FIG. 3. The method 400 begins at operation 402, where the signal source 108 generates the signal 106 and transmits the signal 106 to the surface 104. From operation 402, the method 400 proceeds to operation 404, where the signal source 108 generates and sends the disruption signal 112 to the user device 110. It should be understood that operations 402 and 404 may be performed as illustrated, simultaneously, or in reverse order.

From operation 404, the method 400 proceeds to operation 406, where the user device 110 receives the disruption signal 112 from the signal source 108 and sends the disruption signal 112 through the user's 102 body to the surface 104 so that the disruption signal 112 disrupts the signal 106 being transmitted to the surface 104 by the signal source 108. In this manner, the user 102 and/or the user device 110 is not disturbed by the signal 106.

From operation 406, the method 400 proceeds to operation 408. The method 400 ends at operation 408.

Figure 5:
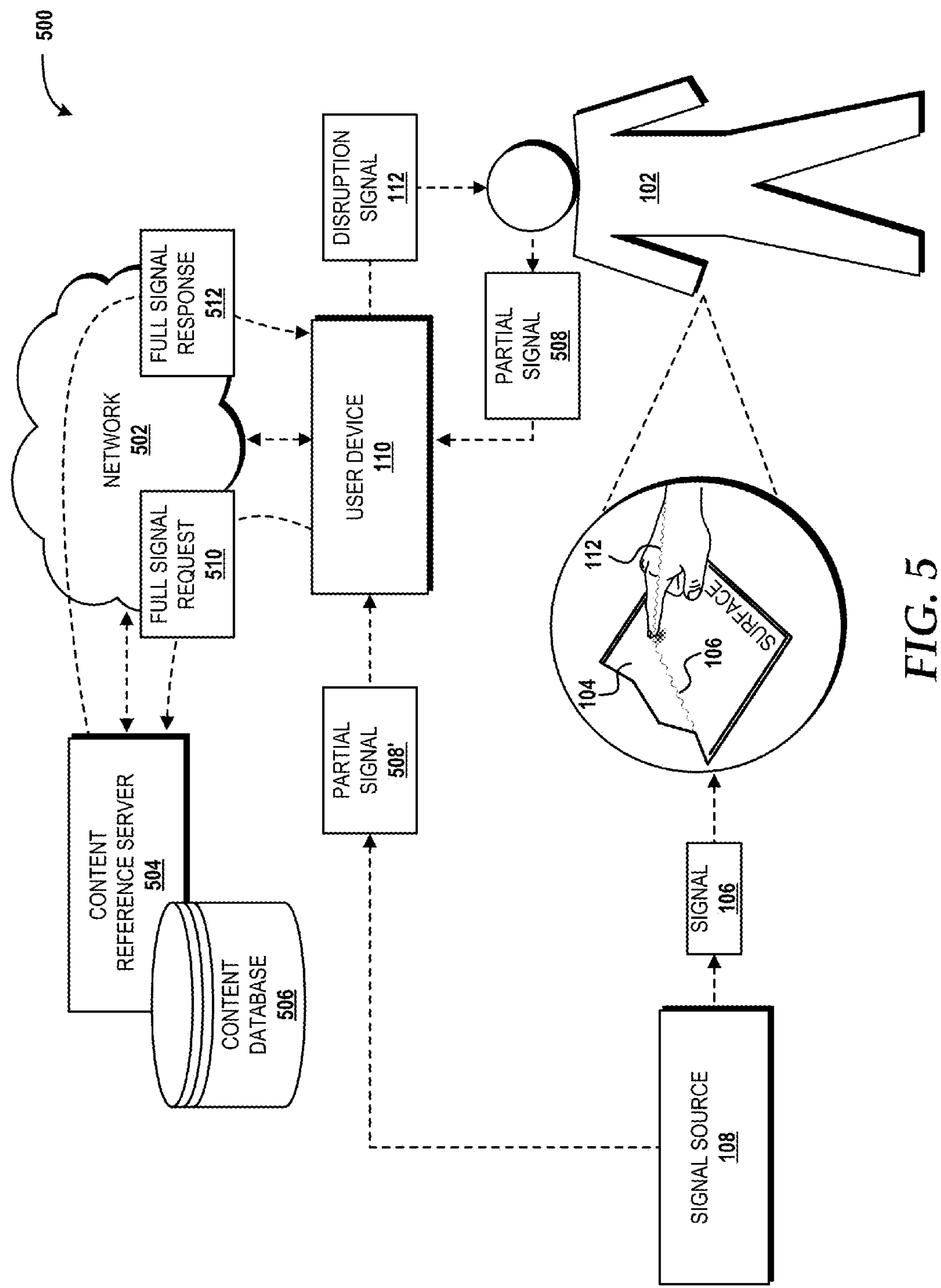
FIG. 5 is a block diagram illustrating aspects of an illustrative operating environment for various concepts disclosed herein, according to another illustrative embodiment.

Turning now to FIG. 5, a block diagram illustrating aspects of another operating environment 500 will be described, according to an illustrative embodiment. The operating environment 500 shown in FIG. 5 includes the user 102 in contact with the surface 104 that receives the signal 106 from the signal source 108. When the user 102 is in contact with the surface 104, the signal 106 propagates through the surface 104 into the user's 102 body. The signal 106 may be any signal as described herein above.

The user device 110, in FIG. 5, can operate in communication with and/or as part of a communications network ("network") 502. The network 502 is illustrated and described in greater detail herein below with reference to FIG. 11.

The user device 110 can communicate with a content reference server 504 via the network 502. The content reference server 504 includes or is in communication with a content database 506. The content database 506 can store one or more signals associated with content that is audible to the user 102. For example, the content may include one or more audio advertisements that are being transmitted by or expected to be transmitted by the signal source 108. The signal(s) contained in the content database 506 may be used as a reference for identifying undesirable signals being transmitted by or expected to be transmitted by the signal source 108 and/or other signal sources (not shown). The content database 506 may be owned and/or operated by the same entity as the signal source 108. Alternatively, the content database 506 may be associated with the user 102 or a plurality of users (not shown).

In some embodiments, the user 102 provides input to the user device 110 to instruct the user device 110 to record one or more signals being transmitted from one or more signal sources 108 and to save the signal(s) in the content database 506 for future reference for identifying undesirable signals. In some other embodiments, the user device 110 notifies the user 102 when a signal is received, and prompts the user 102 to provide input regarding whether or not to save the signal in the content database 506. The content database 506 may be populated in other ways not particularly described herein. As such, the example population methods described above are merely illustrative, and should not be construed as being limiting in any way.

In the illustrated example, the user device 110 receives a partial signal 508 from the user's 102 body or the signal source 108. The partial signal 508 includes a portion of the signal 106 that has propagated through the surface 104 and through the user's 102 body. A partial signal 508' includes a portion of the signal 106 as captured by the user device 110 without having propagated through the surface 104 or the user's 102 body. Using either the partial signal 508 or the partial signal 508', the user device 110 generates a full signal request 510 directed to the content reference server 504. The full signal request 510 includes the partial signal 508 or the partial signal 508' along with instructions to provide the matching full signal, if available. By way of example, the partial signal 508 includes a snippet of the first three seconds of an advertisement, and the full signal request 510 may include the snippet along with instructions for the content reference server 504 to provide the full advertisement that includes the snippet to the user device 110.

The content reference server 504 receives the full signal request from the user device 110 and queries the content database 506 for a matching full signal. If no matching full signal is found, the content reference server 504 may generate a full signal response 512 that includes an indication that no full signal was found. In such instances, the user device 110 may receive the full signal response 512 and prompt the user 102 to respond regarding whether or not he or she desires to save the signal 106 when the signal 106 is received by the user device 110. In this manner, the user device 110 can update the content database 506 with the signal 106 for future signal disruption attempts. If a matching full signal is found, the content reference server 504 may generate a full signal response 512 that includes the full signal.

Assuming a full signal is included in the full signal response 512, the user device 110 extracts the full signal from the full signal response 512 and generates the disruption signal 112. The user device 110 may generate the disruption signal 112 to include frequency, amplitude, and/or phase characteristics that at least partially cancel the full signal that was extracted from the full signal response 512. The disruption signal 112 may be generated by changing the frequency, amplitude, and/or phase characteristics of the full signal. For instances in which the full signal is audible to the user 102, such as an advertisement, the user device 110 may generate the disruption signal 112 by shifting the frequency of the full signal to an inaudible range rather than at least partially cancelling out the full signal.

The user device 110 transmits the disruption signal 112 to the user's 102 body. The disruption signal 112 propagates through the user's 102 body to the surface 104 with which the user 102 is in contact. The disruption signal 112 disrupts the signal 106 that is propagating through the surface 104.

The content database 506 is illustrated as being external to the user device 110 and accessible by the user device 110 by way of the network 502. In some embodiments, however, the content database 506 is stored locally on the user device 110.

Figure 6:
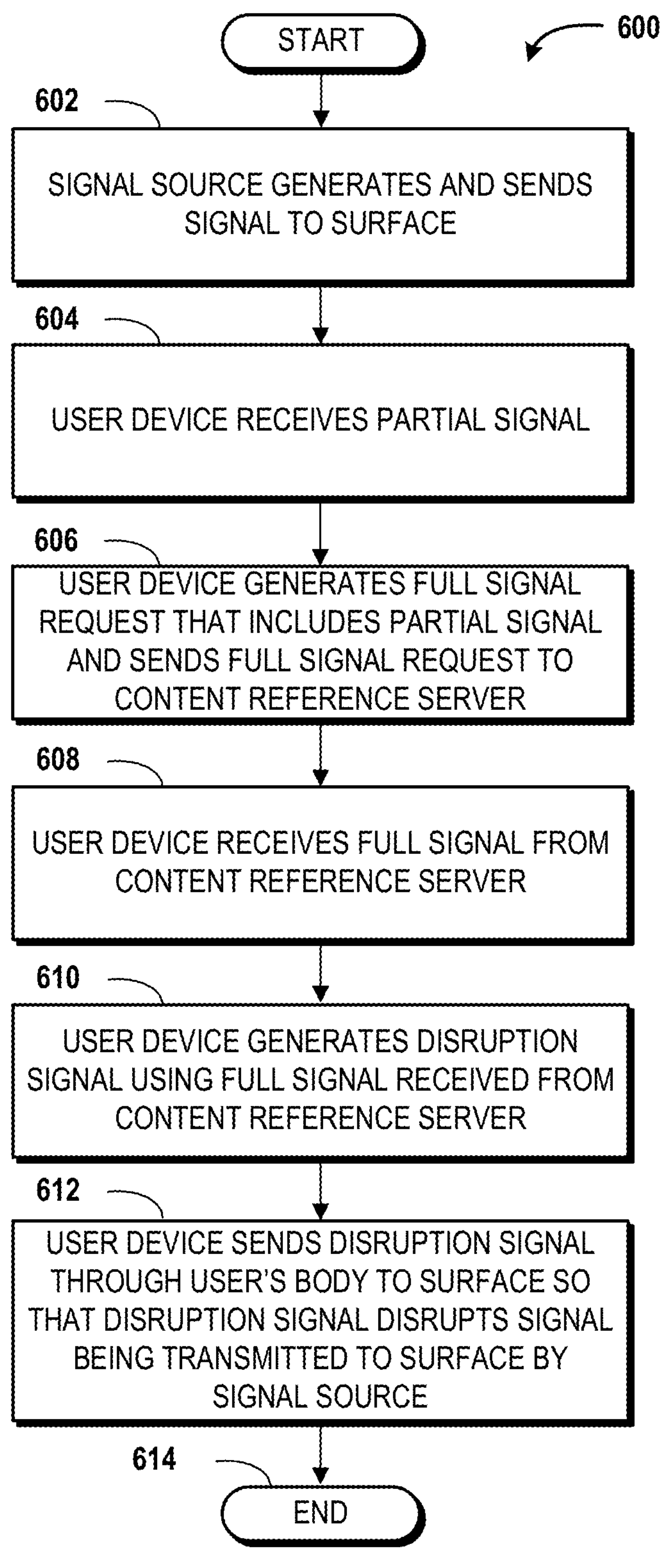
FIG. 6 is a flow diagram illustrating aspects of a method for disrupting a bone conduction signal, according to another illustrative embodiment.

Turning now to FIG. 6, aspects of a method 600 for disrupting a bone conduction signal will be described in detail, according to an illustrative embodiment. The method 600 will be described with reference to FIG. 6 and further reference to FIG. 5. The method 600 begins at operation 602, where the signal source 108 generates the signal 106 and transmits the signal 106 to the surface 104. From operation 602, the method 600 proceeds to operation 604, where the user device 110 receives the partial signal 508 or the partial signal 508'. From operation 604, the method 600 proceeds to operation 606, where the user device 110 generates the full signal request 510 and sends the full signal request 510 to the content reference server 504. The full signal request 510 includes the partial signal 508 or the partial signal 508' that was received by the user device 110.

From operation 606, the method 600 proceeds to operation 608, where the user device 110 receives a full signal that matches the partial signal 508 or the partial signal 508' that was included in the full signal request 510. If no matching full signal is found, the content reference server 504 may generate a full signal response 512 that includes an indication that no full signal was found. In such instances, the user device 110 may receive the full signal response 512 and prompt the user 102 to respond regarding whether or not he or she desires to save the signal 106 when the signal 106 is received by the user device 110. In this manner, the user device 110 can update the content database 506 with the signal 506 for future signal disruption attempts.

From operation 608, the method 600 proceeds to operation 610, where the user device 110 generates the disruption signal 112 using the full signal received from the content reference server 504. The user device 110 may generate the disruption signal 112 to include frequency, amplitude, and/or phase characteristics that at least partially cancel the full signal that was extracted from the full signal response 512. The disruption signal 112 may be generated by changing the frequency, amplitude, and/or phase characteristics of the full signal. For instances in which the full signal is audible to the user 102, such as an advertisement, the user device 110 may generate the disruption signal 112 by shifting the frequency of the full signal to an inaudible range rather than at least partially cancelling out the full signal.

From operation 610, the method 600 proceeds to operation 612, where the user device 110 sends the disruption signal 112 through the user's 102 body to the surface 104 so that the disruption signal 112 disrupts the signal 106 being transmitted to the surface 104 by the signal source 108. In this manner, the user 102 and/or the user device 110 is not disturbed by the signal 106.

From operation 612, the method 600 proceeds to operation 614. The method 600 ends at operation 614.

Figure 7:
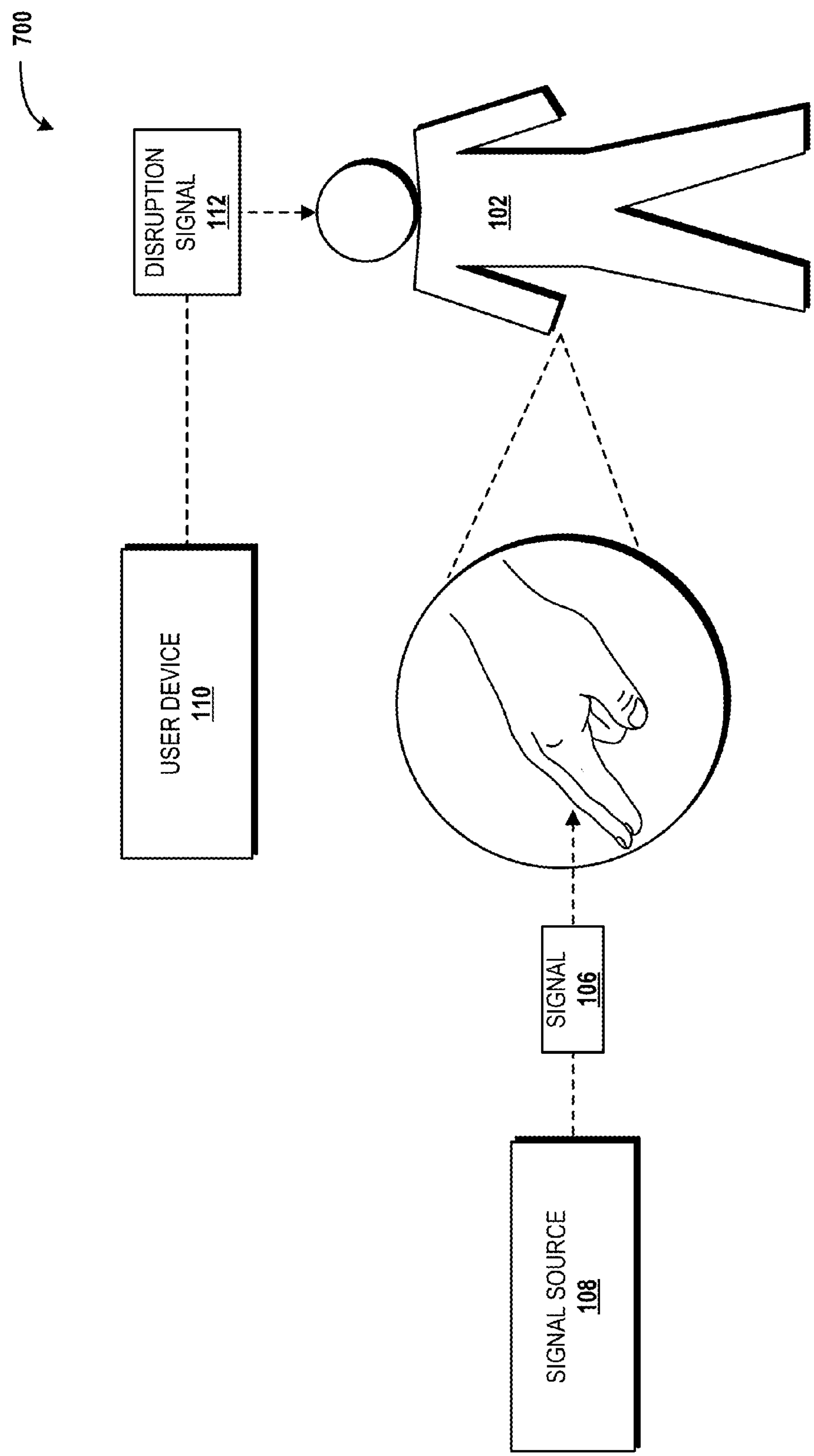
FIG. 7 is a block diagram illustrating aspects of an illustrative operating environment for various concepts disclosed herein, according to another illustrative embodiment.

Turning now to FIG. 7, a block diagram illustrating aspects of another operating environment 700 will be described, according to an illustrative embodiment. The operating environment 700 shown in FIG. 7 includes the user 102 who receives the signal 106 from the signal source 108. The signal 106 then propagates through the surface 104 to the user's 102 body. The signal 106 may be any signal as described herein above.

The user 102 may desire to disrupt the signal 106. The user 102 may provide input to the user device 110 to disrupt the signal 106 while the signal source 108 is transmitting the signal 106 to the user's 102 body. In response the user device 110 can generate the disruption signal 112 and send the disruption signal to the user's 102 body to disrupt the signal 106. The disruption signal 112 in this case can be audible and/or inaudible noise. For example, the disruption signal 112 may introduce white, pink, brown, or other noise to mask audible sounds carried in the signal 106. Alternatively, the user device 110 may be configured with a signal disruption feature that can be enabled and disabled by the user 102 to allow or prevent at least a portion of the signals being transmitted from one or more sources.

Figure 8:
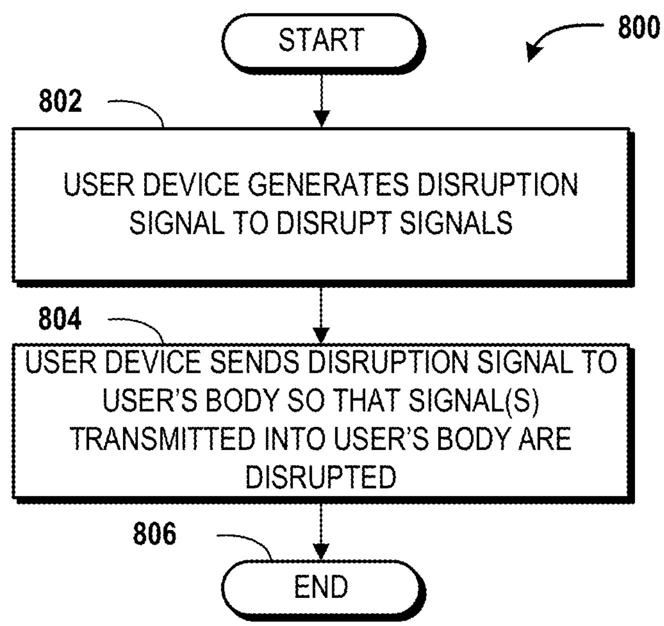
FIG. 8 is a flow diagram illustrating aspects of a method for disrupting a bone conduction signal, according to another illustrative embodiment.

Turning now to FIG. 8, aspects of another method 800 for disrupting a bone conduction signal will be described in detail, according to an illustrative embodiment. The method 800 will be described with reference to FIG. 8 and further reference to FIG. 7. The method 800 begins at operation 802, where the user device 110 generates the disruption signal to disrupt one or more signals, such as the signal 106. From operation 802, the method 800 proceeds to operation 804, where the user device 110 sends the disruption signal 112 to the user's 102 body so that one or more signals transmitted into the user's 102 body are disrupted. From operation 804, the method 800 proceeds to operation 806. The method 800 ends at operation 806.

Figure 9:
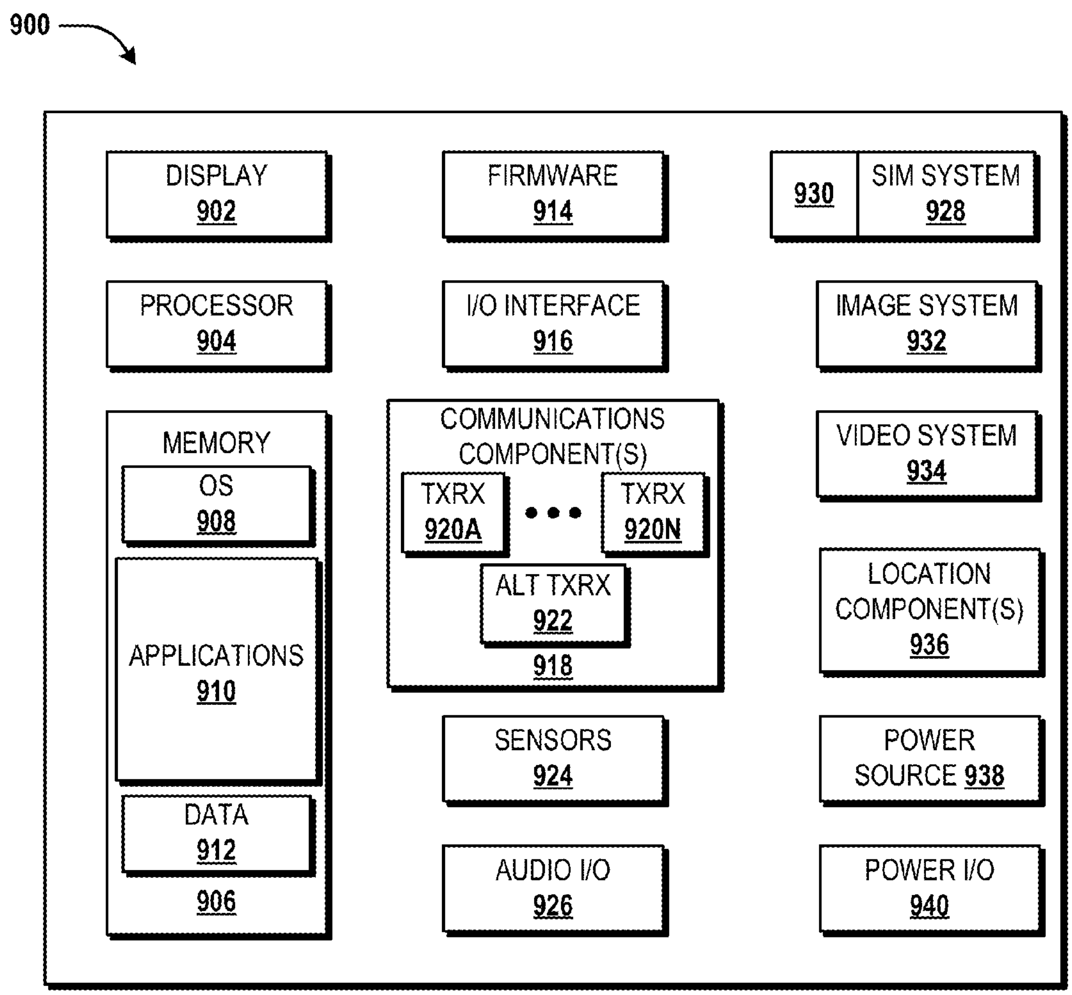
FIG. 9 is a block diagram illustrating an example mobile device capable of implementing aspects of the embodiments disclosed herein.

Turning now to FIG. 9, an illustrative mobile device 900 and components thereof will be described. In some embodiments, the user device 110 described above can be configured as and/or can have an architecture similar or identical to the mobile device 900 described herein in FIG. 9. It should be understood, however, that the user device 110 may or may not include the functionality described herein with reference to FIG. 9. While connections are not shown between the various components illustrated in FIG. 9, it should be understood that some, none, or all of the components illustrated in FIG. 9 can be configured to interact with one other to carry out various device functions. In some embodiments, the components are arranged so as to communicate via one or more busses (not shown). Thus, it should be understood that FIG. 9 and the following description are intended to provide a general understanding of a suitable environment in which various aspects of embodiments can be implemented, and should not be construed as being limiting in any way.

As illustrated in FIG. 9, the mobile device 900 can include a display 902 for displaying data. According to various embodiments, the display 902 can be configured to display various graphical user interface ("GUI") elements, text, images, video, advertisements, various prompts, virtual keypads and/or keyboards, messaging data, notification messages, metadata, internet content, device status, time, date, calendar data, device preferences, map and location data, combinations thereof, and the like. The mobile device 900 also can include a processor 904 and a memory or other data storage device ("memory") 906. The processor 904 can be configured to process data and/or can execute computer-executable instructions stored in the memory 906. The computer-executable instructions executed by the processor 904 can include, for example, an operating system 908, one or more applications 910, other computer-executable instructions stored in a memory 908, or the like. In some embodiments, the applications 910 also can include a UI application (not illustrated in FIG. 9).

The UI application can interface with the operating system 908 to facilitate user interaction with functionality and/or data stored at the mobile device 900 and/or stored elsewhere. In some embodiments, the operating system 908 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 904 to aid a user in entering content, viewing account information, answering/initiating calls, entering/deleting data, entering and setting user IDs and passwords for device access, configuring settings, manipulating address book content and/or settings, multimode interaction, interacting with other applications 910, and otherwise facilitating user interaction with the operating system 908, the applications 910, and/or other types or instances of data 912 that can be stored at the mobile device 900. The data 912 can include user preferences, user settings, the content database 506, and/or other data. The applications 910 can include, for example, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 910, the data 912, and/or portions thereof can be stored in the memory 906 and/or in a firmware 914, and can be executed by the processor 904. The firmware 914 also can store code for execution during device power up and power down operations. It can be appreciated that the firmware 914 can be stored in a volatile or non-volatile data storage device including, but not limited to, the memory 906 and/or a portion thereof.

The mobile device 900 also can include an input/output ("I/O") interface 916. The I/O interface 916 can be configured to support the input/output of data such as location information, user information, organization information, presence status information, user IDs, passwords, and application initiation (start-up) requests. In some embodiments, the I/O interface 916 can include a hardwire connection such as USB port, a mini-USB port, a micro-USB port, an audio jack, a PS2 port, an IEEE 1394 ("FIREWIRE") port, a serial port, a parallel port, an Ethernet (RJ411) port, an RJ11 port, a proprietary port, combinations thereof, or the like. In some embodiments, the mobile device 900 can be configured to synchronize with another device to transfer content to and/or from the mobile device 900. In some embodiments, the mobile device 900 can be configured to receive updates to one or more of the applications 910 via the I/O interface 916, though this is not necessarily the case. In some embodiments, the I/O interface 916 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 916 may be used for communications between the mobile device 900 and a network device or local device.

The mobile device 900 also can include a communications component 918. The communications component 918 can be configured to interface with the processor 904 to facilitate wired and/or wireless communications with one or more networks such as the network 122 described above herein. In some embodiments, other networks include networks that utilize non-cellular wireless technologies such as WI-FI or WIMAX. In some embodiments, the communications component 918 includes a multimode communications subsystem for facilitating communications via the cellular network and one or more other networks.

The communications component 918, in some embodiments, includes one or more transceivers. The one or more transceivers, if included, can be configured to communicate over the same and/or different wireless technology standards with respect to one another. For example, in some embodiments one or more of the transceivers of the communications component 918 may be configured to communicate using Global System for Mobile communication ("GSM"), Code Division Multiple Access ("CDMA"), CDMAONE, CDMA2000, Long-Term Evolution ("LTE"), and various other 2G, 2.5G, 3G, 4G, and greater generation technology standards. Moreover, the communications component 918 may facilitate communications over various channel access methods (which may or may not be used by the aforementioned standards) including, but not limited to, Time Division Multiple Access ("TDMA"), Frequency Division Multiple Access ("FDMA"), Wideband CDMA ("W-CDMA"), Orthogonal Frequency-Division multiplexing ("OFDM"), Space-Division Multiple Access ("SDMA"), and the like.

In addition, the communications component 918 may facilitate data communications using Generic Packet Radio Service ("GPRS"), Enhanced Date Rates for GSM Evolution ("EDGE"), the High-Speed Packet Access ("HSPA") protocol family, including High-Speed Downlink Packet Access ("HSDPA"), Enhanced Uplink ("EUL") or otherwise termed Highs-Speed Uplink Packet Access ("HSUPA"), HSPA+, and various other current and future wireless data access standards. In the illustrated embodiment, the communications component 918 can include a first transceiver ("TxRx") 920A that can operate in a first communications mode (e.g., GSM). The communications component 918 also can include an $N^{th}$ transceiver ("TxRx") 920N that can operate in a second communications mode relative to the first transceiver 920A (e.g., UMTS). While two transceivers 920A-N (hereinafter collectively and/or generically referred to as "transceivers 920") are shown in FIG. 9, it should be appreciated that less than two, two, and/or more than two transceivers 920 can be included in the communications component 918.

The communications component 918 also can include an alternative transceiver ("Alt TxRx") 922 for supporting other types and/or standards of communications. According to various contemplated embodiments, the alternative transceiver 922 can communicate using various communications technologies such as, for example, WI-FI, WIMAX, BLUETOOTH, infrared, IRDA, NFC, other RF technologies, combinations thereof, and the like.

In some embodiments, the communications component 918 also can facilitate reception from terrestrial radio networks, digital satellite radio networks, internet-based radio service networks, combinations thereof, and the like. The communications component 918 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 900 also can include one or more sensors 924. The sensors 924 can include temperature sensors, light sensors, air quality sensors, movement sensors, orientation sensors, noise sensors, proximity sensors, or the like. As such, it should be understood that the sensors 924 can include, but are not limited to, accelerometers, magnetometers, gyroscopes, infrared sensors, noise sensors, microphones, combinations thereof, or the like. Additionally, audio capabilities for the mobile device 900 may be provided by an audio I/O component 926. The audio I/O component 926 of the mobile device 900 can include one or more speakers for the output of audio signals, one or more microphones for the collection and/or input of audio signals, and/or other audio input and/or output devices.

The illustrated mobile device 900 also can include a subscriber identity module ("SIM") system 928. The SIM system 928 can include a universal SIM ("USIM"), a universal integrated circuit card ("UICC") and/or other identity devices. The SIM system 928 can include and/or can be connected to or inserted into an interface such as a slot interface 930. In some embodiments, the slot interface 930 can be configured to accept insertion of other identity cards or modules for accessing various types of networks. Additionally, or alternatively, the slot interface 930 can be configured to accept multiple subscriber identity cards. Because other devices and/or modules for identifying users and/or the mobile device 900 are contemplated, it should be understood that these embodiments are illustrative, and should not be construed as being limiting in any way.

The mobile device 900 also can include an image capture and processing system 932 ("image system"). The image system 932 can be configured to capture or otherwise obtain photos, videos, and/or other visual information. As such, the image system 932 can include cameras, lenses, charge-coupled devices ("CCDs"), combinations thereof, or the like. The mobile device 900 may also include a video system 934. The video system 934 can be configured to capture, process, record, modify, and/or store video content. Photos and videos obtained using the image system 932 and the video system 934, respectively, may be added as message content to an MMS message, email message, and sent to another mobile device. The video and/or photo content also can be shared with other devices via various types of data transfers via wired and/or wireless communication devices as described herein.

The mobile device 900 also can include one or more location components 936. The location components 936 can be configured to send and/or receive signals to determine a geographic location of the mobile device 900. According to various embodiments, the location components 936 can send and/or receive signals from global positioning system ("GPS") devices, assisted-GPS ("A-GPS") devices, WI-FI/WIMAX and/or cellular network triangulation data, combinations thereof, and the like. The location component 936 also can be configured to communicate with the communications component 918 to retrieve triangulation data for determining a location of the mobile device 900. In some embodiments, the location component 936 can interface with cellular network nodes, telephone lines, satellites, location transmitters and/or beacons, wireless network transmitters and receivers, combinations thereof, and the like. In some embodiments, the location component 936 can include and/or can communicate with one or more of the sensors 924 such as a compass, an accelerometer, and/or a gyroscope to determine the orientation of the mobile device 900. Using the location component 936, the mobile device 900 can generate and/or receive data to identify its geographic location, or to transmit data used by other devices to determine the location of the mobile device 900. The location component 936 may include multiple components for determining the location and/or orientation of the mobile device 900.

The illustrated mobile device 900 also can include a power source 938. The power source 938 can include one or more batteries, power supplies, power cells, and/or other power subsystems including alternating current ("AC") and/or direct current ("DC") power devices. The power source 938 also can interface with an external power system or charging equipment via a power I/O component 940. Because the mobile device 900 can include additional and/or alternative components, the above embodiment should be understood as being illustrative of one possible operating environment for various embodiments of the concepts and technologies described herein. The described embodiment of the mobile device 900 is illustrative, and should not be construed as being limiting in any way.

Figure 10:
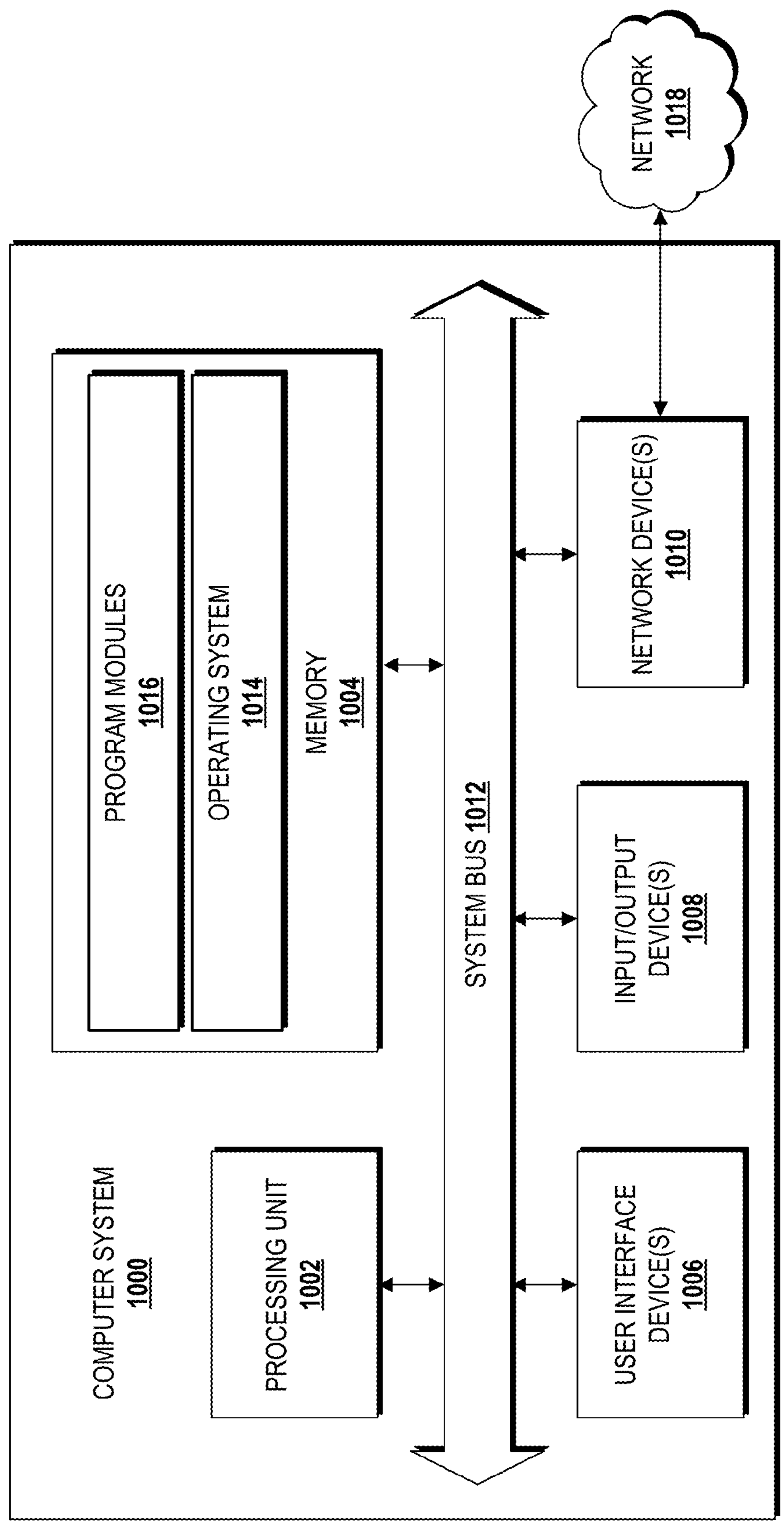
FIG. 10 is a block diagram illustrating an example computer system capable of implementing aspects of the embodiments presented herein.

FIG. 10 is a block diagram illustrating a computer system 1000 configured to provide the functionality in accordance with various embodiments of the concepts and technologies disclosed herein. In some implementations, the signal source 108, the user device 110, the signal detection system 114, and/or the content reference server 504 are configured to utilize an architecture that is the same as or similar to the architecture of the computer system 1000. It should be understood, however, that modification to the architecture may be made to facilitate certain interactions among elements described herein.

The computer system 1000 includes a processing unit 1002, a memory 1004, one or more user interface devices 1006, one or more input/output ("I/O") devices 1008, and one or more network devices 1010, each of which is operatively connected to a system bus 1012. The bus 1012 enables bi-directional communication between the processing unit 1002, the memory 1004, the user interface devices 1006, the I/O devices 1008, and the network devices 1010.

The processing unit 1002 may be a standard central processor that performs arithmetic and logical operations, a more specific purpose programmable logic controller ("PLC"), a programmable gate array, a system-on-a-chip, or other type of processor known to those skilled in the art and suitable for controlling the operation of the server computer. Processing units are generally known, and therefore are not described in further detail herein.

The memory 1004 communicates with the processing unit 1002 via the system bus 1012. In some embodiments, the memory 1004 is operatively connected to a memory controller (not shown) that enables communication with the processing unit 1002 via the system bus 1012. The memory 1004 includes an operating system 1014 and one or more program modules 1016. The operating system 1014 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1016 may include various software and/or program modules to perform the various operations described herein. The program modules 1016 and/or other programs can be embodied in computer-readable media containing instructions that, when executed by the processing unit 1002, perform one or more of the operations described herein. According to embodiments, the program modules 1016 may be embodied in hardware, software, firmware, or any combination thereof. Although not shown in FIG. 10, it should be understood that the memory 1004 also can be configured to store the content database 506 and/or other data, if desired.

By way of example, and not limitation, computer-readable media may include any available computer storage media or communication media that can be accessed by the computer system 1000. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1000. In the claims, the phrase "computer storage medium" and variations thereof does not include waves or signals per se and/or communication media.

The user interface devices 1006 may include one or more devices with which a user accesses the computer system 1000. The user interface devices 1006 may include, but are not limited to, computers, servers, personal digital assistants, cellular phones, or any suitable computing devices. The I/O devices 1008 enable a user to interface with the program modules 1016. In one embodiment, the I/O devices 1008 are operatively connected to an I/O controller (not shown) that enables communication with the processing unit 1002 via the system bus 1012. The I/O devices 1008 may include one or more input devices, such as, but not limited to, a keyboard, a mouse, or an electronic stylus. Further, the I/O devices 1008 may include one or more output devices, such as, but not limited to, a display screen or a printer.

The network devices 1010 enable the computer system 1000 to communicate with other networks or remote systems via a network 1018, such as the network 502. Examples of the network devices 1010 include, but are not limited to, a modem, a radio frequency ("RF") or infrared ("IR") transceiver, a telephonic interface, a bridge, a router, or a network card. The network 1018 may include a wireless network such as, but not limited to, a Wireless Local Area Network ("WLAN"), a Wireless Wide Area Network ("WWAN"), a Wireless Personal Area Network ("WPAN") such as provided via BLUETOOTH technology, a Wireless Metropolitan Area Network ("WMAN") such as a WiMAX network or metropolitan cellular network. Alternatively, the network 1018 may be a wired network such as, but not limited to, a Wide Area Network ("WAN"), a wired LAN such as provided via Ethernet, a wired Personal Area Network ("PAN"), or a wired Metropolitan Area Network ("MAN").

Figure 11:
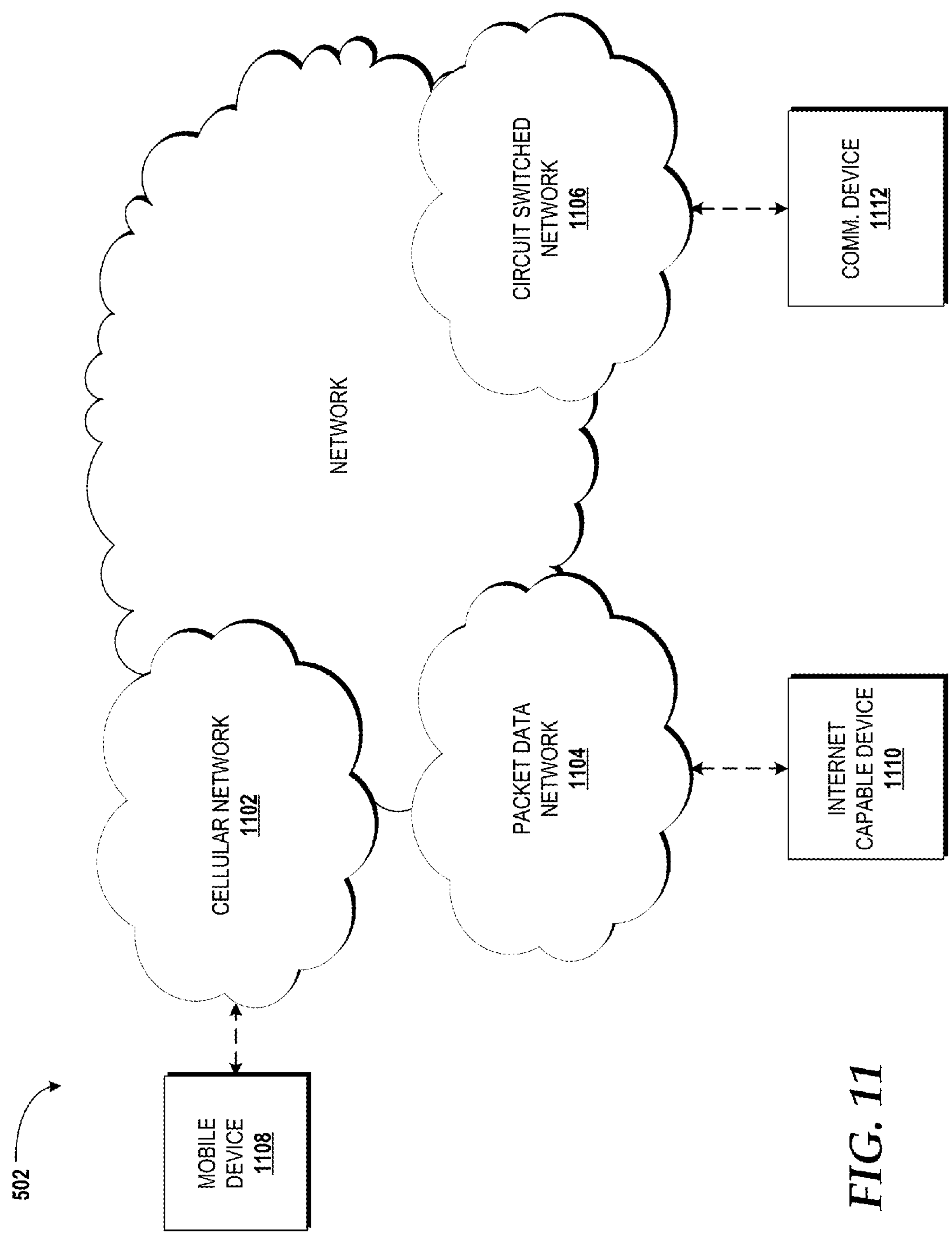
FIG. 11 schematically illustrates a network, according to an illustrative embodiment.

Turning now to FIG. 11, additional details of the network 502 are illustrated, according to an illustrative embodiment. The network 502 includes a cellular network 1102, a packet data network 1104, for example, the Internet, and a circuit switched network 1106, for example, a publicly switched telephone network ("PSTN"). The cellular network 1102 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1102 also includes radios and nodes for receiving and transmitting voice, data, and combinations thereof to and from radio transceivers, networks, the packet data network 1104, and the circuit switched network 1106.

A mobile communications device 1108, such as, for example, a cellular telephone, a user equipment, a mobile terminal, a PDA, a laptop computer, a handheld computer, the user device 110, and combinations thereof, can be operatively connected to the cellular network 1102. The cellular network 1102 can be configured as a 2G GSM network and can provide data communications via GPRS and/or EDGE. Additionally, or alternatively, the cellular network 1102 can be configured as a 3G UMTS network and can provide data communications via the HSPA protocol family, for example, HSDPA, EUL (also referred to as HSUPA), and HSPA+. The cellular network 1102 also is compatible with 4G mobile communications standards such as LTE, or the like, as well as evolved and future mobile standards.

The packet data network 1104 includes various devices, for example, servers, computers, databases, and other devices in communication with one another, as is generally known. The packet data network 1104 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1104 includes or is in communication with the Internet. The circuit switched network 1106 includes various hardware and software for providing circuit switched communications. The circuit switched network 1106 may include, or may be, what is often referred to as a plain old telephone system ("POTS"). The functionality of a circuit switched network 1106 or other circuit-switched network are generally known and will not be described herein in detail.

The illustrated cellular network 1102 is shown in communication with the packet data network 1104 and a circuit switched network 1106, though it should be appreciated that this is not necessarily the case. One or more Internet-capable devices 1110, for example, the user device 110, a PC, a laptop, a portable device, or another suitable device, can communicate with one or more cellular networks 1102, and devices connected thereto, through the packet data network 1104. It also should be appreciated that the Internet-capable device 1110 can communicate with the packet data network 1104 through the circuit switched network 1106, the cellular network 1102, and/or via other networks (not illustrated).

As illustrated, a communications device 1112, for example, a telephone, facsimile machine, modem, computer, the user device 110, or the like, can be in communication with the circuit switched network 1106, and therethrough to the packet data network 1104 and/or the cellular network 1102. It should be appreciated that the communications device 1112 can be an Internet-capable device, and can be substantially similar to the Internet-capable device 1110. In the specification, the network 502 is used to refer broadly to any combination of the networks 1102, 1104, 1106. It should be appreciated that substantially all of the functionality described with reference to the network 502 can be performed by the cellular network 1102, the packet data network 1104, and/or the circuit switched network 1106, alone or in combination with other networks, network elements, and the like.

Based on the foregoing, it should be appreciated that concepts and technologies directed to disrupting bone conduction signals have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A device comprising:
a processor; and
a memory that stores instructions that, when executed by the processor, cause the processor to perform operations comprising
receiving a disruption signal for disrupting a signal, and
sending the disruption signal to a body of a user associated with the device to disrupt the signal, wherein the disruption signal sent to the body of the user then propagates through the body of the user to disrupt the signal.

2. The device of claim 1, wherein the disruption signal sent to the body of the user propagates through the body of the user to a surface over which the signal is propagating, wherein the user is in contact with the surface.

3. The device of claim 2, wherein a signal source generates both the signal and the disruption signal and transmits the signal to the surface and the disruption signal to the device.

4. The device of claim 1, wherein a signal source generates both the signal and the disruption signal and transmits both the signal and the disruption signal.

5. The device of claim 1, wherein the operations further comprise:
notifying the user that the disruption signal has been received; and
prompting the user to provide instructions regarding whether or not to use the disruption signal to disrupt the signal.

6. The device of claim 5, wherein the operations further comprise:
receiving, from the user, input instructing the device to use the disruption signal to disrupt the signal; and
storing the input from the user as a preference for disrupting the signal.

7. The device of claim 1, wherein the signal comprises an audible advertisement.

8. A computer-readable storage medium having instructions stored thereon that, when executed by a processor of a device, cause the processor to perform operations comprising:
receiving a disruption signal for disrupting a signal; and
sending the disruption signal through a body of a user associated with the device to disrupt the signal as the signal propagates over a surface external to the body of the user associated with the device.

9. The computer-readable storage medium of claim 8, wherein a signal source generates both the signal and the disruption signal and transmits the signal to the surface and the disruption signal to the device.

10. The computer-readable storage medium of claim 8, wherein the operations further comprise:

notifying the user that the disruption signal has been received; and prompting the user to provide instructions regarding whether or not to use the disruption signal to disrupt the signal.

11. The computer-readable storage medium of claim 10, wherein the operations further comprise:

receiving, from the user, input instructing the device to use the disruption signal to disrupt the signal; and storing the input from the user as a preference for disrupting the signal.

12. The computer-readable storage medium of claim 8, wherein the signal comprises an audible advertisement.

13. A method comprising:

receiving, at a device associated with a user, a disruption signal for disrupting a signal, wherein the device is external to a body of the user; and sending, by the device, the disruption signal through the body of the user to disrupt the signal, wherein sending the disruption signal through the body of the user to disrupt the signal comprises sending, by the device, the disruption signal through the body of the user to a surface external to the body of the user over which the signal is propagating.

14. The method of claim 13, wherein a signal source generates both the signal and the disruption signal and transmits the signal to the surface and the disruption signal to the device.

15. The method of claim 13, wherein a signal source generates both the signal and the disruption signal and transmits both the signal and the disruption signal.

16. The method of claim 13, further comprising:

notifying, by the device, the user that the disruption signal has been received; and prompting, by the device, the user to provide instructions regarding whether or not to use the disruption signal to disrupt the signal.

17. The method of claim 16, further comprising:

receiving, by the device, from the user, input instructing the device to use the disruption signal to disrupt the signal; and storing, by the device, the input from the user as a preference for disrupting the signal.

* * * * *